United States Patent [19]

Miller

[11] 4,374,451
[45] Feb. 22, 1983

[54] METHOD OF ASSEMBLING A CRT USING A CODED SUBASSEMBLY OR PART

[75] Inventor: William R. Miller, Lancaster, Pa.
[73] Assignee: RCA Corporation, New York, N.Y.
[21] Appl. No.: 291,704
[22] Filed: Aug. 10, 1981

Related U.S. Application Data

[63] Continuation-in-part of Ser. No. 41,091, May 21, 1979, abandoned.

[30] Foreign Application Priority Data

Feb. 11, 1980 [TW] Taiwan .................................. 6910347

[51] Int. Cl.$^3$ ........................... H01J 9/20; B23Q 7/12; G06F 15/46
[52] U.S. Cl. ....................................... 445/22; 29/430; 29/563; 198/349; 235/375; 445/45
[58] Field of Search .................. 29/25.1, 25.11, 25.13, 29/430, 563; 198/349; 235/383, 384, 375, 376

[56] References Cited

U.S. PATENT DOCUMENTS

| | | | |
|---|---|---|---|
| 2,506,866 | 5/1950 | Gehrke ................................ 250/27.5 |
| 3,096,184 | 7/1963 | Gallup .................................. 106/20 |
| 3,543,392 | 1/1970 | Perry et al. ........................... 29/563 |
| 3,576,540 | 4/1971 | Fair et al. ......................... 29/563 X |
| 3,589,791 | 6/1971 | Kanellapaulos .................... 29/25.11 |
| 3,680,236 | 8/1972 | Deal et al. ............................. 40/2.2 |
| 3,701,880 | 10/1972 | Rively et al. ................. 219/121 EK |
| 3,792,238 | 2/1974 | Samoel ............................ 51/319 X |
| 3,898,417 | 8/1975 | Atkinson ................ 219/121 LH X |
| 3,903,526 | 9/1975 | Cotter ............................... 51/410 X |
| 4,027,246 | 5/1977 | Caccoma et al. ................. 29/563 X |

FOREIGN PATENT DOCUMENTS

| 824981 | 5/1970 | Canada . |
| 54-125963 | 9/1979 | Japan . |
| 1248069 | 9/1971 | United Kingdom . |
| 1568854 | 6/1980 | United Kingdom . |

OTHER PUBLICATIONS

"Method of Constructing Cathode Ray Tubes", *R.C.A. Technical Notes*, No. 413, Jan. 1961.
Petrikovsky and Krasikov, "Marking and Labeling in Radio & Electronics", Energia Publishers, Moscow, USSR, 1974, p. 181.

*Primary Examiner*—Kenneth J. Ramsey
*Attorney, Agent, or Firm*—E. M. Whitacre; D. H. Irlbeck; L. Greenspan

[57] ABSTRACT

The method of assembling a CRT includes (1) providing at least one envelope part having a unique, optically machine-readable, process-survivable coded marking on an external surface thereof, (2) optically machine-reading the marking, (3) generating a signal in response to step (2), (4) in response to the signal, initiating a local process for action with respect to the envelope part and (5) recording data of the local process with reference to said coded marking. The action may include transportation of the part, assembly of other parts or subassemblies to the part, or testing of an assembly including the part.

8 Claims, 4 Drawing Figures

METHOD OF ASSEMBLING A CRT USING A CODED SUBASSEMBLY OR PART

CROSS-REFERENCES TO RELATED APPLICATIONS

This is a continuation-in-part of application Ser. No. 41,091 filed May 21, 1979, abandoned.

BACKGROUND OF THE INVENTION

This invention relates to a novel method of assembling a CRT (cathode-ray tube) using a coded subassembly or part.

In manufacturing a color television picture tube, which is a CRT, it is the practice to assemble a succession of different subassemblies to one particular part. In one procedure, for example, the mask-frame subassembly is assembled to the panel, then the viewing screen subassembly is assembled to the panel, then the funnel assembly is assembled to the panel, then the electron-gun mount subassembly is assembled to the panel and then, after exhausting, sealing and electrode processing, the implosion-protection subassembly is assembled to the panel. Subsequently, the tube is tested, packed, warehoused, and distributed. The procedure may be more complex if, as occurs in some factories, different sizes and types of product are intermixed during one or more of the steps.

Attempts have been made toward conducting these assembling steps by machine, as well as making each of the subassemblies by machine. These attempts have all employed some amount of human recognition by sight and/or touch. Where machine recognition has been used, the different techniques used for different subassemblies have not been interrelated and in many cases have been incompatible. Furthermore, few of the prior techniques have provided historical data which could be used, for example, for tracing the causes of out-of-spectification product, for warehousing and cost analyses, or for warranty purposes.

However, as the product line becomes more mature, profit margins erode, and there is a need to reduce all product costs to a minimum. This can be done by reducing assembly costs and by the earliest detection and correction of defects. This can be achieved with full automation provided the cost of full automation is not greater than the cost of the prior systems it replaces. One feature of practical full automation is that it can be phased into and out of existing manual and partially-automated portions of the total system.

SUMMARY OF THE INVENTION

The novel method satisfies all of the above-mentioned constraints. The novel method of assembling a CRT comprises providing at least one glass envelope part, which part has a unique, optically machine-readable coded marking on the external surface thereof. The marking is of such character that it can survive, without substantial deterioration, exposure to the hostile ambients employed in the manufacture of the CRT, and exposure to atmospheric conditions for long periods of time. The marking carries information about the characteristics of the part, such as size, etc., and also a serial number or name which distinguishes the part from all other parts. In the novel method, at each successive stage in the manufacture and distribution of the CRT, the marking may be read optically by machine, a control signal is generated in response to the machine reading, and then the control signal initiates a local process with respect to that envelope part. The local process may, for example, select another part, position and/or assemble another part with respect to the envelope part, or test the assembly. Also, data of the local process is recorded with respect to the coded marking on the envelope part.

The assembled CRT comprises an evacuated envelope and means for generating at least one electron beam therein, characterized in that there is a unique, machine-readable, coded marking in an external surface of the envelope. In a preferred form, the envelope includes a glass faceplate panel having a viewing window, an integral peripheral sidewall, and the unique marking in an external surface of the sidewall. This coded marking can be used to select and assemble each of the other CRT parts to the panel, to initiate each of the local processes and test procedures, and to correlate, record and retrieve data relating to the experiences of the panel and all of the subassemblies assembled thereto.

The coded marking survives all of the manufacturing operations and remains in readable condition after the CRT is completely assembled and is rendered operative. The coded marking is a permanent, integral part of the CRT which can be read and used substantially for warranty and historical purposes after the CRT has been installed in an operative circuit.

DETAILED DESCRIPTION

Figures 1, 2:
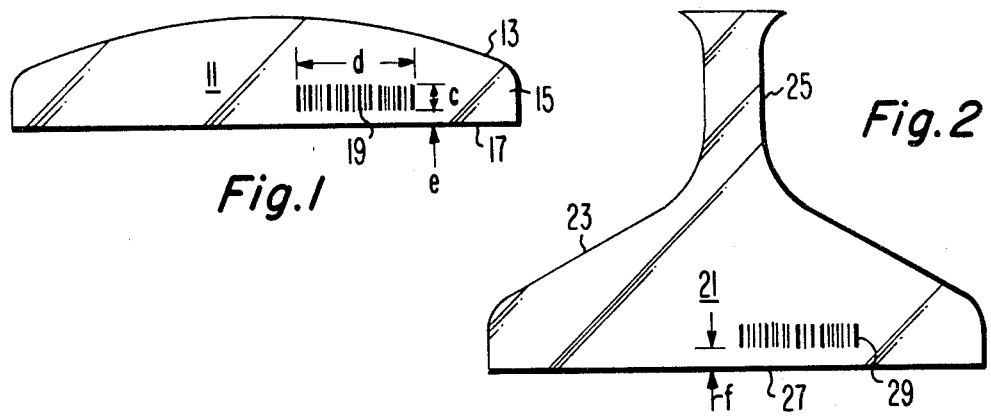
FIG. 1 is an elevational view of a novel faceplate panel.
FIG. 2 is an elevational view of a novel funnel.

A primary need of a computer-aided, semiautomatic, or a completely-computer-operated, fully-automatic system for manufacturing television picture tubes is a reliable information input to the computer about the parts and the subassemblies being handled, and about the handling devices used to transfer the parts and the subassemblies to and from transport conveyors and dedicated processing equipment. The parts and subassemblies may be required to be intermixed as to sizes, or other characteristics in order to reduce machine setup time and to increase the size of the batches that are processed. The best overall approach is to add the required information to the external surface of at least one part. The marking contains that information about the part which is necessary to initiate the required processes and further to uniquely identify the part, the subassembly including the part and, eventually, the completed CRT made therefrom. The marking must be capable of being reliably read by automatic readers, must survive hostile environments and must be produced cheaply. FIGS. 1 and 2 are examples of envelope parts carrying suitable markings.

FIG. 1 is a typical glass faceplate panel 11 to be used as part of the envelope of a color television picture tube. The panel 11 includes a rectangular viewing window 13 and an integral sidewall 15 around the window 13. The sidewall 15 has a panel seal land 17 at the distal end thereof. A machine-readable coded panel marking 19 is abraded into the external surface of the sidewall 15. The panel marking 19 comprises a related sequence of substantially parallel bars of predetermined widths and spacings, which is popularly referred to as a bar-code marking. Any of the codes for bar-code marking may be used on the panel 11. In this specific embodiment, the panel marking 19 uses the interleaved two-of-five code which employs abraded bars of one-unit and three-unit widths and nonabraded spaces therebetween of one-unit and three-unit widths. Since bar codes are described in detail elsewhere, no further description of the code itself is necessary. The panel marking 19 on the panel 11 includes at least 12 digits which include the following coded information:

1 digit: item or part.
1 digit: size.
1 digit: other descriptor of item.
1 digit: factory where marking is made.
1 digit: year marking is made.
7 digits: serial number.

FIG. 2 is a typical glass funnel 21 to be used as part of the envelope of a color television picture tube. The funnel includes a cone 23, a neck 25 integral with the narrow end of the cone 23 and a funnel seal land 27 at the wide end of the cone 23. A machine-readable coded funnel marking 29 as described above for the panel 12 is abraded into the external surface of the cone 23 near the wide end of the cone 23. If the funnel 21 is to be used with the panel 11 or a similarly-marked panel, the funnel marking 29 includes at least 5 digits which include the following information:

1 digit: item or part.
1 digit: size.
1 digit: other descriptor of item.
1 digit: factory where marking is made.
1 digit: year marking is made.

If the funnel marking 29 is to be used as the ultimate tube marking, then the marking would include 7 additional digits for the serial number. In that case, the panel marking 19 may have but would not need 7 digits as a serial number.

In both FIGS. 1 and 2, the markings 19 and 29 may be placed anywhere on the workpieces. However, for making and reading the markings automatically by machine, it is important that the markings be placed at prescribed locations that are easily and accurately located and accessed for reading. As shown in FIG. 1, the panel marking 19 and the marks thereof are a distance c, typically about 19 mm (0.75 inch) high and a distance d, typically about 63 mm (2.50 inches) long. The closest edge of the panel marking 19 is a distance e, typically about 19 mm (0.75 inch), away from the seal land 17, with the bars of the marking 19 extending in a direction about normal to the surface of the seal land 17. The funnel marking 29 on the funnel 21 shown in FIG. 2 is similar to the above-described panel marking 19 and is located a distance f, typically about 19 mm (0.75 inch), from the funnel seal land 27. During subsequent processing, the panel 11 and the funnel 21 may be joined together at their respective seal lands by methods known in the art.

The panel marking 19 and the funnel marking 29 can survive without substantial deterioration from normal assembly and processing conditions, such as exposure to air at temperatures of 300° to 465° C., for at least one hour. Also, the markings can survive without substantial deterioration exposure to hydrogen fluoride, exposure to 10% caustic solutions, exposure to 8% hydrogen peroxide solution and exposure to organic detergent solution each for at least one minute. Substantial deterioration of a marking occurs when an optical reader produces an unreliable reading or no reading at all. Usually an optical reader makes multiple passes over the marking at one reading, and compares the results of the multiple passes. A suitable test of the marking is to bake the marking in air at 465° C. for one hour and then, after cooling, read the marking with an optical reader.

Any system of coded markings may be used, such as adhering printed labels with adhesive. It is preferred, however, that the markings are eroded into the surface of the workpiece. Thus, the marking has substantially the same characteristics to the ambient as the workpiece itself, and there are no labels, or inks or adhesives present which could limit the utility of the marking. The marking may be eroded into the surface of the envelope part by abrasion or ablation. The marking may be abraded into the surface, for example, by sandblasting. The marking may be ablated into the surface, for example, by volatilization as with a laser beam.

Abraded markings such as are shown at 19 (FIG. 1) and 29 (FIG. 2) can be produced by any suitable abrading process and with any abrading apparatus that can suitably define and locate the marks of the marking. A preformed template or stencil on the workpiece to define the marks in combination with a means to abrade the exposed surface with a blast of particles may be used, but it is slow, cumbersome and expensive. A suitable method and apparatus on which abraded markings can be made rapidly and cheaply on demand are described in U.S. Pat. App. Ser. No. 41,092 by P. M. Heyman filed May 21, 1979.

Ablated markings similar to those shown at 19 (FIG. 1) and 29 (FIG. 2) can be produced by scribing suitably-spaced parallel lines with a laser beam. Also, suitable ablated markings can be produced by targetting a series of parallel strip-like areas of unit widths and then ablating selected ones of these areas with a laser beam. This latter method is disclosed in U.S. Pat. App. Ser. No. 77,915 by M. J. Nierenberg filed Sept. 24, 1979 now U.S. Pat. No. 4,323,755.

Eroded areas of the marking (abraded or ablated) have a different reflecting characteristic from the adjacent noneroded surface. In vitreous materials, such as glass, the markings appear as areas of greater reflectivity because the erosion changes the specular nature of the surface to a more diffuse one. Therefore, for reading the marking, if the geometrical arrangements among a light source, the marking and a detector put the detector off the specular angle, the light scattered into the detector will be increased in the eroded region. Eroded (abraded or ablated) markings may be read also by detecting the difference in reflectivity in the surface. It is this difference which allows an eroded marking to be read by a process including optically detecting the reflection from the marked surface. Two devices that may be used to read eroded markings are a laser scanner and a TV camera. In the laser scanner, a light beam is scanned across the marked surface whereby the reflected light is modulated by the occurrence of eroded or noneroded areas. With a TV camera, either ambient light or a fixed light source provides the required illumination to activate the photosensitive surfaces in relation to the eroded or noneroded areas of the marking.

The optical contrast between the eroded and noneroded areas of a marking, for both the abraded and ablated types, can be enhanced if the marking is in a thin, light-reflective coating integral with the envelope part. In one form, a white or light-colored coating is employed. In another form, a thin black or dark-colored undercoating and a thin white or light-colored overcoating is used. In both cases, the marking is eroded through the white or light-colored coating. This method of improving the optical contrast of the marking is disclosed in U.S. Pat. App. Ser. No. 78,440 by P. M. Heyman et al filed Sept. 24, 1979, now U.S. Pat. No. 4,327,283.

With a viable identification and tracking capability as described above, an overall system can be provided using this capability at all stages of the manufacture and distribution of the CRT. Also, each specific part of the overall system can be tailored to local and overall efficiency using the capability. And, conversely, each specific part of the system can be tailored to be disconnected and be operated locally or manually with improved efficiency.

Figure 3:
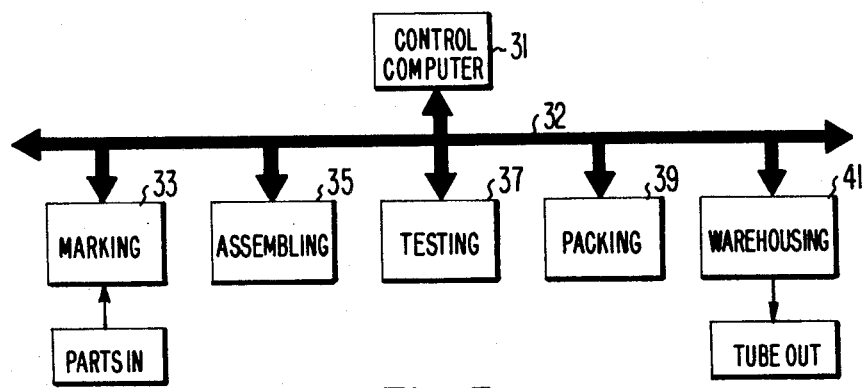
FIG. 3 is a block diagram of an overall system using the novel method.

FIG. 3 is a block diagram of an overall system showing a control computer 31 with the capability of receiving, storing and retrieving data with respect to each particular tube made through a control computer communications line 32. At the first stage, shown by the box 33, the control part, such as the panel 11 shown in FIG. 1, receives its marking. Also, other parts to be assembled to the control part receive their markings. Then, as shown by the box 35, the tube is fabricated. During this stage, the other parts are added and various local processes are carried out, which may be initiated in response to signals generated after a reading of the marking. Data such as the time, equipment used, etc. may be recorded. Then, as shown by the box 37, the tube is tested, and data as to time, equipment used and performance may be taken and stored in the computer 31 by a local process which may be initiated in response to a control signal derived from a reading of the marking. Then, the tube is packed as shown by the box 39 and warehoused as shown by the box 41, and data, such as the time, the packing used, the customer, the warranty, etc., may be taken and stored in the computer 31 by a local process which may be initiated in response to a control signal derived from a reading of the coded marking. Where a tube is subsequently returned by a television-set maker (a line return), the coded marking is in usable form and may be read by machine. Stored data on the tube as identified by its coded marking can be correlated with newly-received data to gain insights toward improved designs and procedures. Where a tube is subsequently returned by a television-set owner (a field return), the coded marking is in usable form and may be read by machine. Stored data on the tube as identified by its coded marking can be correlated with newly-received data to gain insights on improved tube and set designs and improved warranty programs. In both cases, a local process can be initiated for payment under a warranty of the particular CRT.

A more detailed analysis of tube fabrication shown by the box 35 shows that there are two types of work stations. One type is an assembly station and the other is a process station. Such analyses show the importance and the cooperative function of machine-readable markings to the parts and to the overall system.

In an assembly station, two parts or subassemblies are brought together and mated, usually by some process applied to one or both of the parts or subassemblies. The system must guarantee that the proper parts are assembled and that the mating is properly completed. By one program, the control marking on the control part is read and a control signal generated by the reading is fed to the computer 31. In response to the control signal, the computer then instructs a mechanism to find a particular other part or subassembly to be mated to it. When the other part or subassembly is found, the computer generates a control signal which is applied to initiate the transfer and mating of the two subassemblies, after which the mated combination is tested and the test data is fed to the computer to assure its proper completion. Assurance results in the release of the assembled combination to the next work station, whereas nonassurance results in a rejection of the combination and removal from the assembly line.

In a process station, no parts are added to the control subassembly, but some process must be done such as transferring, electrode processing, or testing. The control marking is read, and a control signal is fed to the computer. The system, knowing the history of the control subassembly, selects the process program in response to the control signal and then initiates the required process which is then locally controlled.

Figure 4:
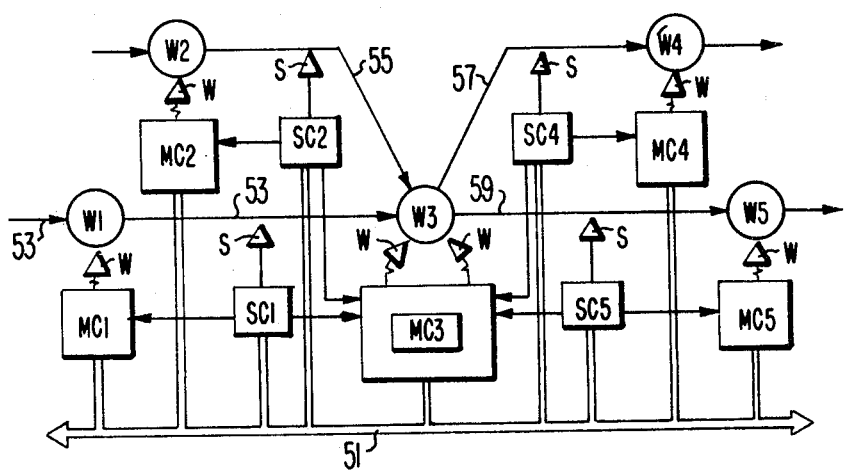
FIG. 4 is a schematic diagram of five work stations interconnected for the automatic assembly of two subassemblies using the novel method.

A complete factory consists of a network of these two types of work stations interconnected by some means of transport. A single assembly step may involve many work stations and many readings of the coded marking. This is illustrated in FIG. 4 in which there are five work stations W1, W2, W3, W4 and W5, each with an intelligent controller MC1, MC2, MC3, MC4, and MC5 which may be a microcomputer. The controllers receive signal inputs from machine-scanned marking readers which may be laser-beam scanners, marked S in a triangle, on the transport lines and from hand-scanned marking readers or wands, marked W in a triangle, at the work stations through a central computer communications line connected to the control computer 51. As shown in FIG. 4, a control subassembly enters a first work station W1 along a first input path 53 where its control marking is read, the generated control signal is processed at MC1 and is sent to the computer. The computer signals a second work station W2 to advance a selected second subassembly in W2 to advance along a second input path 55 to a third work station W3 and, at the same time the computer signals W1 to advance the control subassembly to W3. The markings are read during the transfer and also when subassemblies are positioned in the third work station W3. When the subassemblies are properly positioned in W3, the third controller MC3 initiates a local program for assembling the two subassemblies, after which the assembly is tested and sent along either a reject path 57 to a fourth work station W4 or a good product path 59 to a fifth work station W5. Again the markings are read during the transfer and upon arrival at the selected work station. The computer records the signal from each reader W and S indicating the time when a particular subassembly was at a particular point in the assembling system.

Some examples of subassemblies that can be assembled by a local program initiated in response to a control signal derived from a reading of the control marking at a particular location are as follows. A mask-frame subassembly can be assembled to a panel. A funnel can be assembled to a panel. An electron-gun mount assembly can be assembled with respect to the panel. Some examples of factory processes that can be initiated by a local program initiated in response to a control signal derived from a reading of a control marking at a particular location are as follows. A screened mask-panel assembly can be loaded on, baked in and unloaded from a panel baking lehr. A completed bulb assembly can be loaded on, baked, exhausted, hermetically sealed and unloaded from an exhaust machine. A sealed bulb assembly can be loaded on, electrically processed and unloaded from an aging conveyor.

What is claimed is:

1. In a method of assembling a series of CRTs, each said CRT comprising a plurality of parts assembled with respect to one another, each said CRT including at least one glass envelope part, the steps comprising
   (1) advancing a series of said at least one glass envelope parts,
   (2) producing in each said parts a unique, optically machine-readable process-survivable coded marking on the external surface thereof,
   (3) optically machine-reading each said coded marking,
   (4) generating a control signal related to each said coded marking in response to step (3),
   (5) in response to each signal, initiating a local process for action with respect to said envelope part and
   (6) recording data of said local process with reference to each said coded marking.

2. The method defined in claim 1 wherein said marking shows substantially no deterioration after being exposed to air at 465° C. for one hour.

3. The method defined in claim 2 including exposing said marking to air at temperatures between 300° and 465° C. for at least one hour.

4. The method defined in claim 1 wherein said marking shows substantially no deterioration after being exposed to hydrogen fluoride, 10% caustic solutions, 8% hydrogen peroxide solution and organic detergent solution each for at least one minute.

5. The method defined in claim 1 wherein said marking is produced by eroding said external surface.

6. The method according to claim 1 wherein said marking is produced by abrading said external surface.

7. The method defined in claim 1 wherein said envelope part is a glass faceplate panel including a viewing window and an integral peripheral sidewall, said sidewall having a panel seal land at the distal end thereof and said coded marking is located in the outer surface of said sidewall in a prescribed location with respect to said panel seal land.

8. The method defined in claim 1 wherein said envelope part is a cone-shaped glass funnel having a neck integral with the narrow end thereof and a funnel seal land at the wide end thereof, and said coded marking is located in the outer surface of said funnel in a prescribed location with respect to said funnel seal land.

* * * * *

UNITED STATES PATENT AND TRADEMARK OFFICE
CERTIFICATE OF CORRECTION

PATENT NO. : 4,374,451
DATED : February 22, 1983
INVENTOR(S) : William Raymond Miller It is certified that error appears in the above-identified patent and that said Letters Patent is hereby corrected as shown below:

Title Page, Item [30]  Delete "Foreign Application Priority Data Feb. 11, 1980 [TW] Taiwan 6910347"

Title Page, Item [56]  Change "824981 5/1970 Canada" to --842981 5/1970 Canada--

Column 3, line 26  Change "panel 12" to --panel 11--

Signed and Sealed this

Fourteenth Day of June 1983

[SEAL]

Attest:

DONALD J. QUIGG

Attesting Officer

Acting Commissioner of Patents and Trademarks